Dec. 31, 1968     N. R. HAGLER ET AL     3,419,105
VEHICLE ROAD SPEED CONTROL SYSTEM
Filed Oct. 5, 1966     Sheet 1 of 5

INVENTORS
Joseph R. Doerr,
Norman R. Hagler,
William J. Johnston
BY Earl W. Pierce D. D. McGraw
ATTORNEY INVENTORS
Joseph F. Doerr,
Norman R. Hagler,
William J. Johnston &
BY Earl W. Pierce D. D. McGraw

ATTORNEY

INVENTORS
Joseph R. Doerr,
Norman R. Hagler,
William J. Johnston &
BY Earl W. Pierce

ATTORNEY

INVENTORS
Joseph F. Doerr,
Norman R. Hagler,
William J. Johnston &
Earl W. Pierce

ATTORNEY

United States Patent Office 3,419,105
Patented Dec. 31, 1968

3,419,105
VEHICLE ROAD SPEED CONTROL SYSTEM
Norman R. Hagler, Flint, Earl W. Pierce, Grand Blanc, and Joseph F. Doerr and William J. Johnston, Flint, Mich., assignors to General Motors Corporation, Detroit, Mich., a corporation of Delaware
Filed Oct. 5, 1966, Ser. No. 584,605
4 Claims. (Cl. 180—108)

ABSTRACT OF THE DISCLOSURE

A vehicle road speed control system having a servomotor controlling the engine throttle valve, the servomotor being controlled by a speed error responsive valve which in turn is controlled by actual vehicle speed and a desired vehicle speed setting. A clutch is held in the released position while the system is inactive and is clutched to a vehicle speed sensor when the system is activated to cause the speed error responsive valve to control the servomotor to maintain actual vehicle speed substantially at the desired vehicle speed.

---

The invention relates to a vehicle road speed control system and more particularly to such a system having a servomotor controlled by a speed error responsive valve, which in turn is controlled by actual vehicle speed and a desired vehicle speed setting. Controls are also provided as a part of the system which cause system inactivation upon the application of a vehicle control member such as a brake pedal, as well as direct manual inactivation, and desired vehicle speed resetting means. The system utilizes a source of fluid pressure different from atmospheric pressure as a power source. This pressure source is also the source from which a control signal is generated under influence of the speed error responsive valve. The source of this fluid pressure may be engine intake manifold vacuum. The system is arranged to sense actual vehicle speed, to set a particular vehicle speed as the desired vehicle speed, to power the engine throttle valve in such a manner as to control the vehicle engine speed and power to maintain a desired vehicle speed under variable road load conditions, and to be inactivated at will by the vehicle operator. The throttle valve is illustrated as the vehicle speed controller but in other types of engines different vehicle speed controllers may be used.

Figure 1:
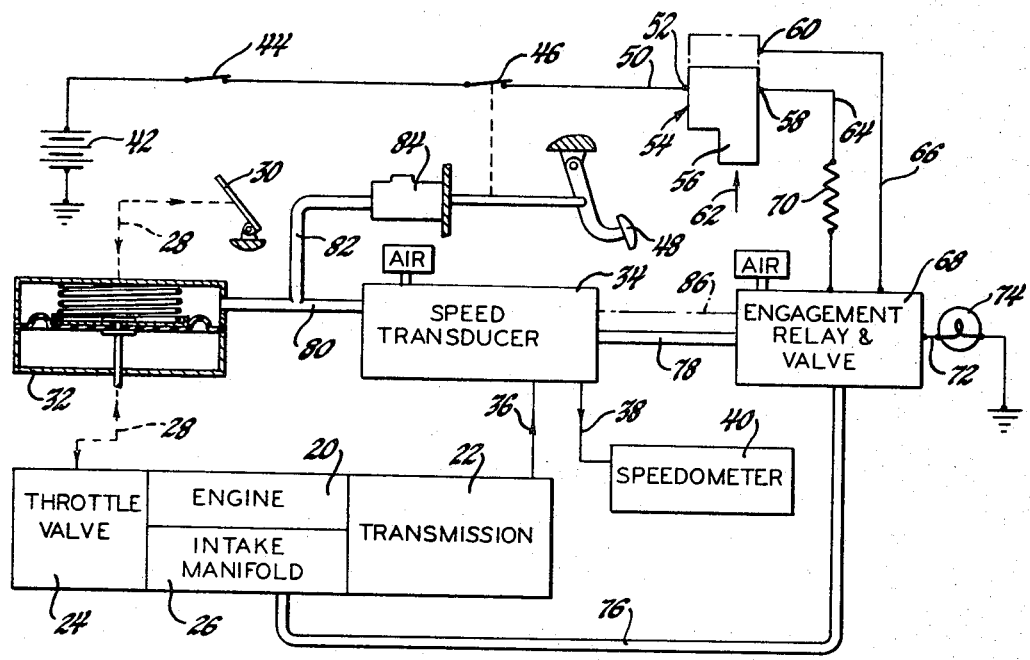
FIGURE 1 is a schematic representation of a system embodying the invention.

The speed control system schematically illustrated in FIGURE 1 is shown installed in a motor vehicle having an engine 20 driving a vehicle transmission 22 and having a throttle valve 24, an engine intake manifold 26, and throttle linkage 28 connected to the throttle valve and manually actuated by the accelerator pedal 30. The system includes a power servomotor 32 which is connected to the throttle linkage 28. As schematically illustrated, the power servomotor 32 is actually a part of the throttle linkage 28 interconnecting the accelerator pedal 30 with the throttle valve 24. A speed transducer assembly 34 receives an actual vehicle speed signal through the transmission output shaft driven flexible cable 36 and compares it to a desired vehicle speed to generate a speed error signal to control the servomotor 32. An extension 38 of the flexible cable 36 drives the usual vehicle speedometer 40.

Portions of the system are electrical and include the source of electrical energy schematically illustrated as the vehicle battery 42, the ignition switch 44 and a normally closed switch 46, which is opened when the vehicle brakes are applied by depression of brake pedal 48. These electrical elements are in series in electrical lead 50 which connects the brake switch 46 to a contact 52 of a manually controlled switch 54. The slide bar 56 of switch 54 is biased so that it is normally in electrical contact with switch contact 52 and another switch contact 58. A third switch contact 60 is so positioned that movement of the slide bar 56 in the direction of the arrow 62 will cause all three contacts 52, 58 and 60 to be in electrical contact with the slide bar 56. This position of the slide bar is illustrated in dashed lines. Further movement of the slide bar 56 in the direction of arrow 62 will electrically disconnect contact 52 from the slide bar. Electrical leads 64 and 66 are respectively connected to contacts 58 and 60 and lead to the engagement relay and valve assembly 68. Lead 64 contains a suitable resistor 70. Lead 72 from the engagement relay 68 may be suitably connected to electrical ground through a signal lamp 74.

The fluid circuit includes a conduit 76 fluid connecting the engine intake manifold 26 to the engagement relay and valve assembly 68. A conduit 78 fluid connects the speed transducer assembly 34 and the assembly 68. The valve portion of assembly 68 operates to close conduit 76 and open conduit 78 to atmospheric pressure when the engagement relay is deactivated, and to fluid connect conduits 76 and 78 when the engagement relay is activated. Thus engine intake manifold vacuum is provided to the speed transducer assembly 34 when the system is operative. The speed transducer assembly 34 generates a speed error signal by proportioning vacuum from conduit 78 and atmospheric air pressure in accordance with a desired vehicle speed and the actual vehicle speed signal received through cable 36. This signal is transmitted through conduit 80 to the power servomotor 32 and causes the servomotor to adjust the opening and closing of the throttle valve 24 in accordance with varying road load conditions. A conduit 82 is connected with conduit 80 and a valve 84. This valve is normally in the closed position when the brake pedal 48 is in the released position, so that the end of conduit 82 is closed. However, when the brake pedal is depressed, the valve 84 opens to atmospheric pressure, immediately allowing this pressure to enter the servomotor 32 and therefore deactivate the servomotor. Since the brake switch 46 is also opened by depression of the brake pedal, the engagement relay and valve assembly 68 will also be de-energized so that the valve portion of that assembly will close the end of conduit 76. The speed transducer 34 is schematically illustrated as having a mechanical connection 86 with the engagement relay and valve assembly 68. This connection is provided to drive a minimum speed switch electrically connected with electrical lead 66 and which is open until a certain minimum vehicle speed is attained. This speed may, for example, be set at 25 m.p.h. By employing this switch, the engagement relay may not be energized at lower speeds even though the switch 54 is operated in an attempt to activate the system.

The speed transducer illustrated in FIGURES 3 through 7 may be utilized in the system of FIGURE 1. The assembly includes a housing 88 having a chamber formed therein which contains a vehicle actual speed signal generating mechanism and also contains a minimum speed engagement switch. The vehicle speed signal transmitted through cable 36 is received by the input shaft 92 which is rotatably received in housing 88. A through shaft 94 is also rotatably mounted in the housing and is connected to the input shaft 92. An output shaft 96 is connected to through shaft 94 and to the flexible cable 38 which drives the speedometer 40. An eddy current magnet 98 is connected to be rotatably driven by shaft 94 in accordance with vehicle speed. A speed cup 100 is mounted on a sleeve bearing 102 and is arcuately moved by the magnet 98 in accordance with actual vehicle speed, in a manner commonly accomplished in speedometer mechanisms. A field plate 104 is adjustably secured in housing 88 and positioned adjacent the speed cup 100 so that calibration adjustments may be made to the mechanism during manufacture, as may be necessary. A cylindrical clutch member 106 is secured to sleeve bearing 102 and angularly moves with the speed cup 100. An electrically conductive ring 108 is mounted on one end of the clutch member 106, and an electrically nonconductive cam 110 is positioned over an arcuate portion of ring 108. The minimum speed switch includes contact springs 112 and 114, which are aligned for electrical engagement with ring 108. However, cam 110 is so positioned that it engages contact spring 112 and holds that spring out of electrical contact with ring 108 until a predetermined desired minimum speed is attained and indicated by sufficient arcuate movement of speed cup 100 and clutch member 106 to remove the cam from engagement with the spring. The spring then moves into electrical engagement with ring 108 to close the minimum speed switch.

A torsion spring 116 is provided against which the speed cup 100 moves, and is so calibrated as to permit arcuate movement of the speed cup to accurately reflect vehicle speed.

Figure 5:
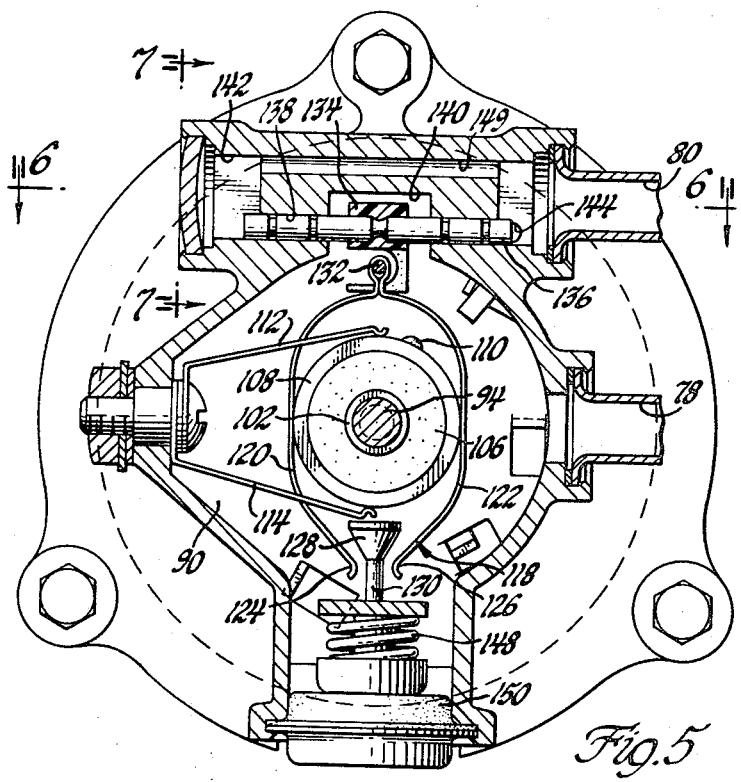
FIGURE 5 is a cross section view of the speed transducer of FIGURE 3, with parts broken away, and taken in the direction of arrows 5—5 of that figure.
Figure 6:
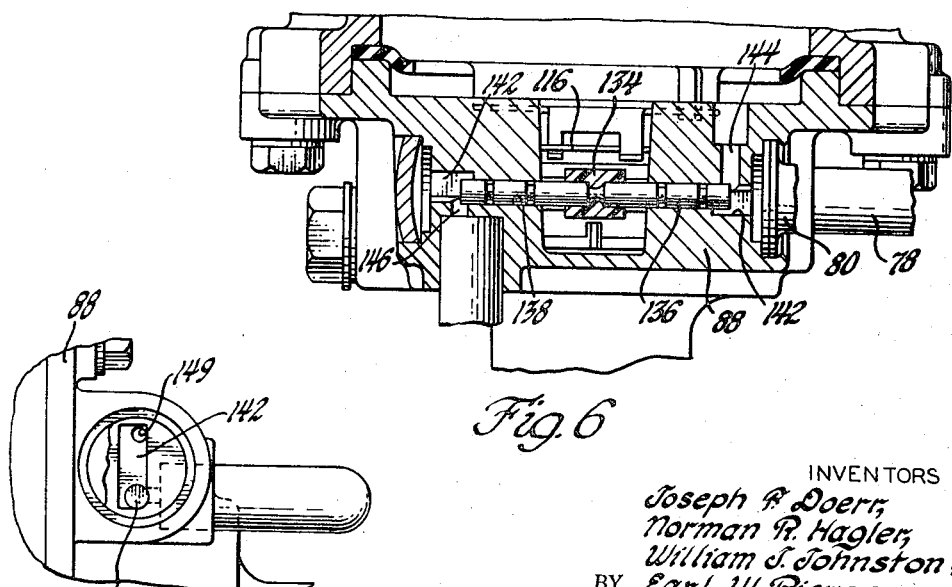
FIGURE 6 is a section view of a part of the speed transducer of FIGURE 3, as taken in the direction of arrows 6—6 of FIGURE 5.
Figure 7:
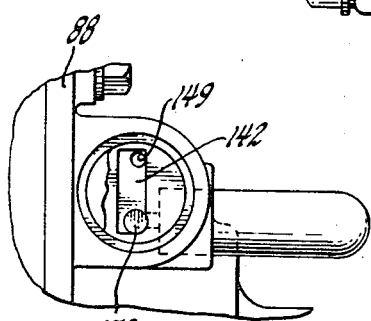
FIGURE 7 is a fragmentary elevation view of a part of the speed transducer of FIGURE 3, as taken in the direction of arrows 7—7 of FIGURE 5.

The other half of the clutch member which is utilized to set the desired speed is formed as a generally U-shaped spring 118 having arms 120 and 122 extending over the rubber-like clutch member 106. The arms are axially spaced from ring 108 and the contact springs 112 and 114 so that their sides are selectively engageable with the cylindrical outer surface of the clutch member 106. The clutch spring ends 124 and 126 are positioned more closely together than are the parts of the arms which engage the clutch member 106. A wedge or cam 128 mounted on a pin 130 extends between the spring ends and when in a lower position engages the ends so as to spread the arms 120 and 122 apart sufficiently to release the spring 118 from the clutch member 106. When the cam 128 is moved to the upper position shown in FIGURE 5, the arms 120 and 122 move inwardly, since they are spring biased in that direction, and grip clutch member 106 so that the spring will then move arcuately with the clutch member, as vehicle speed changes cause the clutch member 106 to move arcuately. The relationship of the clutch member and the spring at the time the clutch member was engaged by the spring arms establishes the desired vehicle speed as the actual speed at which the vehicle was traveling when the cam 128 was moved upwardly to release the spring ends. The center portion of the spring 118 is located opposite the spring ends and has an elongated opening in which a pin 132 is received. This pin is attached to a valve clamp 134, which is secured to the center of the speed error valve 136. This valve is positioned in a bore 138 formed in the housing 88 and intersected by a recess 140 which receives the clamp 134 and allows sufficient axial movement of the valve in the bore in accordance with arcuate movement of the spring 118 to provide the necessary range for generation of a speed error signal. The housing 88 has a passage 149 formed therein and connecting with opposite ends of the valve 136 and with the modulated vacuum conduit 80. A vacuum orifice 144 connects passage 149 with the housing chamber 90, which is in turn connected to the engine intake manifold through conduit 78 when conduit 76 is connected with conduit 78 through the valve portion of assembly 68. This is the operative condition existing when the system is activated. When the system is inactive, chamber 90 is at atmospheric pressure through conduit 78 and the valve portion of assembly 68. Air at atmospheric pressure is also connected to passage 142 through air orifice 146. Orifices 144 and 146 are so positioned relative to the ends of valve 136 that their areas are modulated in a proportional relation during movement of the valve. It is preferable to so establish the orifice positions and valve length that when the valve is centered, as shown in FIGURES 5 and 6, the opposite ends thereof so control their respective orifices that each orifice is approximately half open.

The cam 128 and its pin 130 are urged downwardly by spring 148, which operates against a diaphragm 150. One side of diaphragm 150 is exposed to atmospheric pressure through aperture 152, and the other side is exposed to the pressure existing in housing chamber 90. When the housing chamber is at atmospheric pressure, the diaphragm 150 is positioned downwardly by spring 148 so that the cam 128 wedges spring ends 124 and 126 apart. When the engagement relay has been energized and the valve portion of assembly 68 establishes manifold vacuum in chamber 90 through conduit 78, the pressure differential acts on diaphragm 150 against the force of spring 148 to move the cam 128 upwardly out of engagement with the spring ends 124 and 126. Thus the spring 118 clutches clutch member 106. Valve 136 will immediately become operative to control orifices 144 and 146 and to establish a pressure in the conduit 80 and the servomotor 32 which reflects the desired vehicle speed. Any changes in vehicle speed will cause the valve 136 to modulate atmospheric pressure and manifold vacuum at orifices 144 and 146, resulting in a pressure change in the conduit 80 and the servomotor 32 which is a speed error signal and also a power signal which causes the servomotor to change the effective length of the throttle linkage 28 to open or close the throttle valve 24 in an amount sufficient to change the power and/or speed delivered by engine 20 so as to bring the vehicle back to the desired speed.

Figure 2:
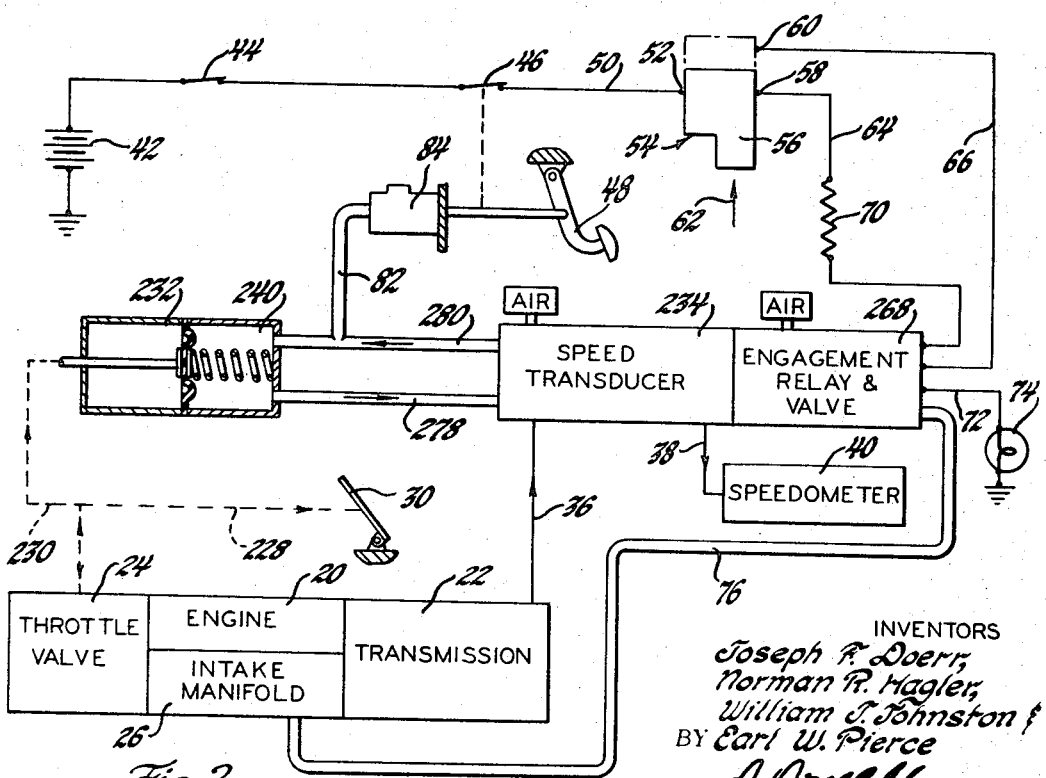
FIGURE 2 is a schematic representation of a modified system embodying the invention.
Figure 3:
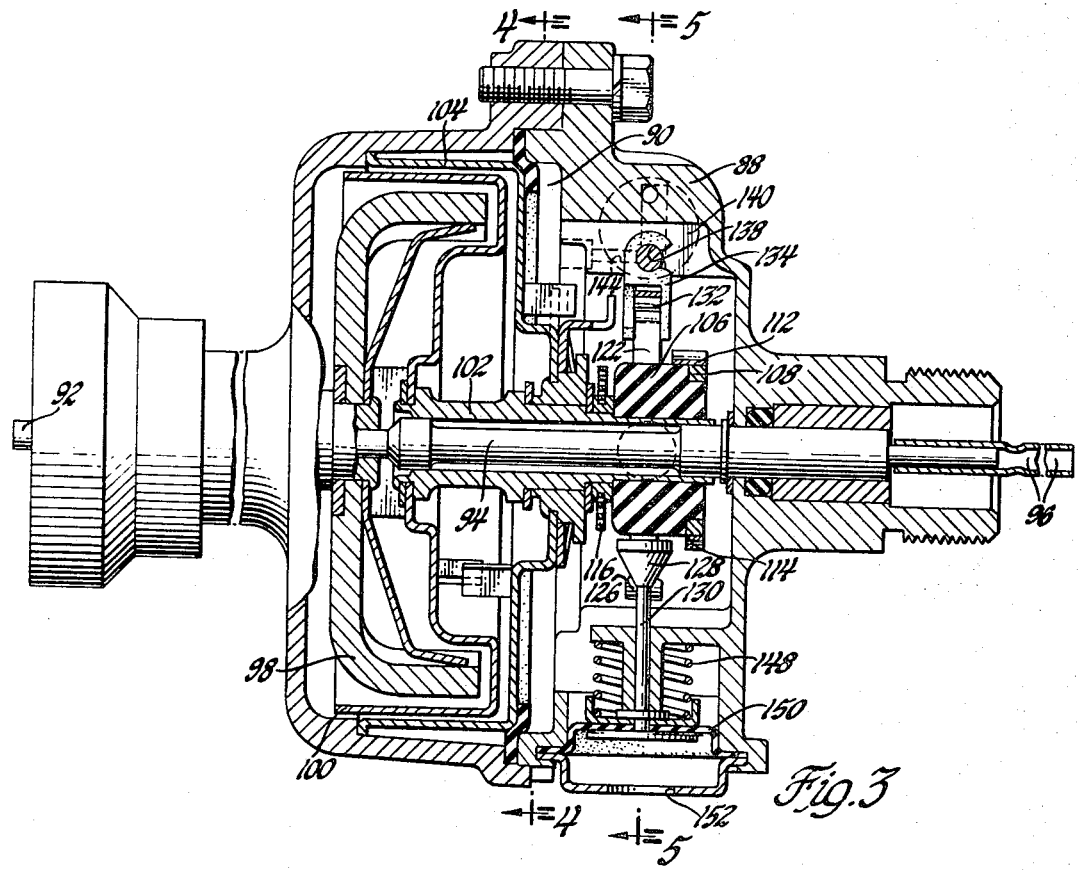
FIGURE 3 is a cross section view with parts broken away of a speed transducer which may be utilized in either of the systems shown in FIGURES 1 and 2.
Figure 4:
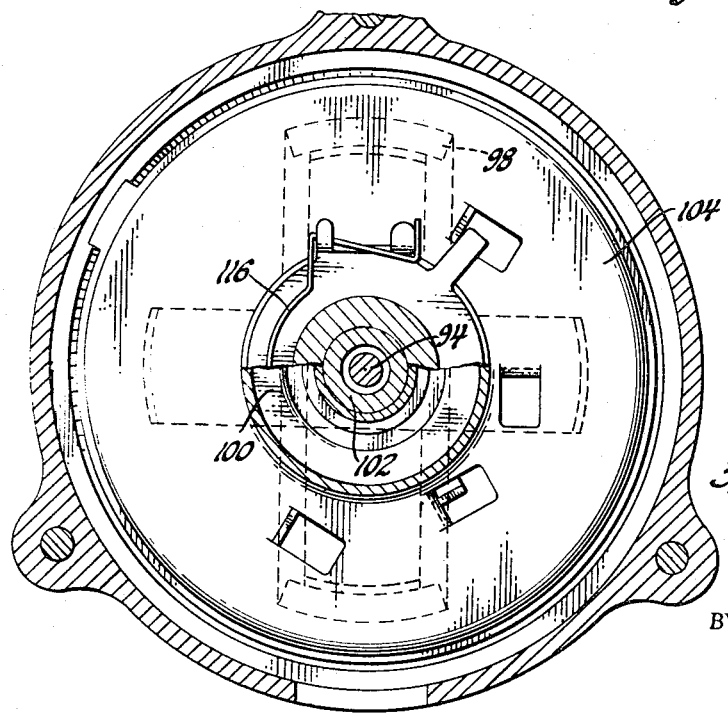
FIGURE 4 is a cross section view of a part of the speed transducer of FIGURE 3, and taken in the direction of arrows 4—4 of that figure.

The modified system shown in FIGURE 2 is generally similar to that of FIGURE 1 but utilizes a somewhat different speed transducer, engagement relay valve assembly, and power servomotor arrangement. Since many of the elements utilized are the same as that of FIGURE 1, the same reference numerals are used where applicable. In this system the power servomotor 232 is connected to throttle linkage 228 by a flexible link 230, which only transmits force in the throttle valve opening direction. Thus the usual throttle closing spring acts on the throttle valve 24 against any force exerted by servomotor 232 on the throttle linkage 228. The engagement relay and valve assembly 268 is formed as a part of the speed transducer assembly 234.

In the system of FIGURE 2 the vacuum line 278, controlled by the valve portion of assembly 268 in alternatively connecting and disconnecting it with atmospheric air and manifold vacuum, is connected to a variable pressure chamber 240 in the servomotor 232. The conduit 280 is also connected with the servomotor variable pressure chamber 240 and transmits the speed error signal generated by the transducer assembly 234 to the servomotor 232. The brake release valve 84 is connected through conduit 82 as before, so that when the brakes are applied and valve 84 is opened, the variable pressure chamber 240 of servomotor 232 will immediately be at atmospheric pressure.

The speed transducer assembly 234, with the engagement relay and valve assembly 268, is shown in greater detail in FIGURES 8 through 11. The assembly has a housing 296 with an atmospheric pressure chamber 298 formed therein. The speedometer cable 36 from the transmission output shaft, or other suitable speed pickup, is connected to the shaft 300, which drives the gear 302. This gear is mounted on shaft 304, which is connected to flexible cable 38 to drive the speedometer 40. Shaft 304 also is so mounted in housing 296 as to rotate the ceramic magnet 306 which forms a part of the actual vehicle speed signal generating mechanism. This construction is generally similar to that of the usual speedometer. A speed cup or disc 308 is mounted on a shaft 310 so that the speed cup is movable angularly to reflect vehicle speed under influence of rotation magnet 306. A torsion spring 312 is connected to shaft 310 and to the speed transducer housing to provide a calibrated resistance to the movement of the speed cup. A field plate 314 is positioned in the housing adjacent the speed cup 308 by means of tabs 316 and mating ramp surfaces 318. The field plate has a gear sector 320 which mates with an adjusting gear 322. As the adjusting gear is rotated the field plate rotates and moves toward or away from the ceramic magnet 306, adjusting the gap therebetween and resulting in a calibration which is set during manufacture. Magnetic force exerted by the magnet 306 holds the field plate tightly against the ramp surfaces and in the desired position. The clutch member 324 is secured to shaft 310 for angular movement therewith. The speed cup driven cam 326 is attached to a part of the clutch member 324, which is axially spaced from the portion selectively clutched by the clutch spring 328.

Figures 8, 9:
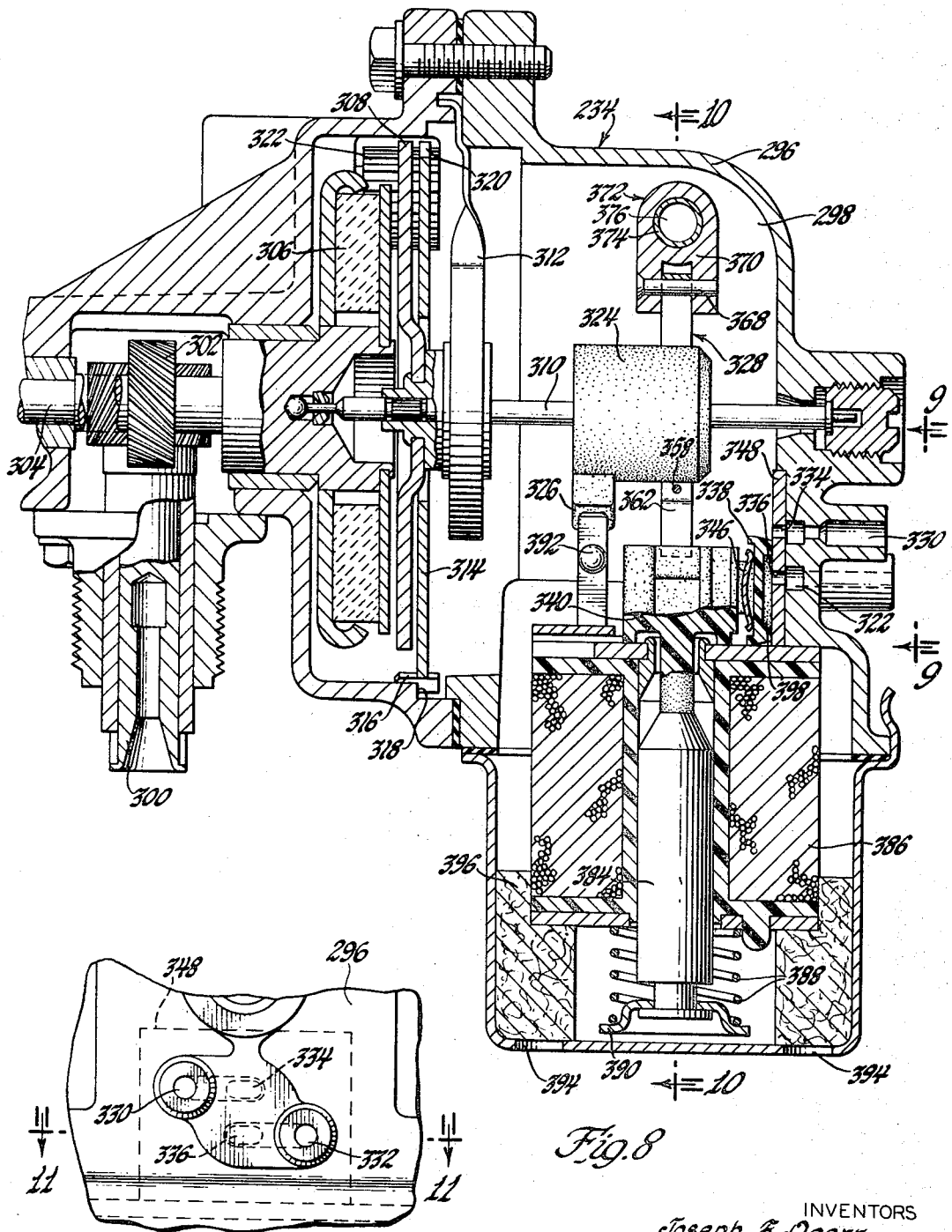
FIGURE 8 is a cross section view, with parts broken away, of a modified speed transducer which may be utilized in the system of FIGURES 1 and 2.
FIGURE 9 is a fragmentary elevation view of a part of the speed transducer of FIGURE 8, taken in the direction of arrows 9—9 of that figure.
Figure 11:
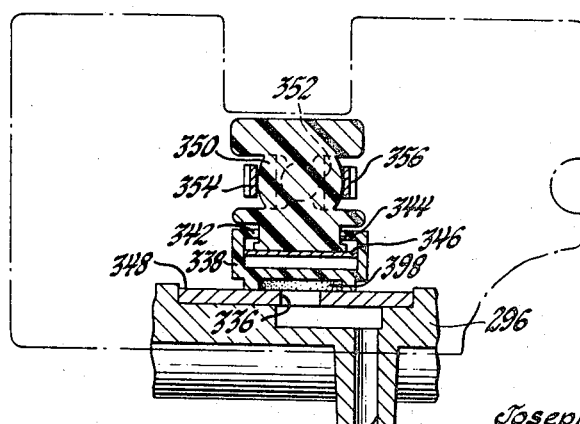
FIGURE 11 is a fragmentary cross section view of a part of the speed transducer of FIGURE 8, taken in the direction of arrows 11—11 of FIGURE 9.

The passages 330 and 332 are formed as an integral part of the transducer housing 296 and are connected with the valve plate apertures 334 and 336 and suitable grooves, as may best be seen in FIGURES 9 and 11. The slide valve 338 is attached to a part of the clutch control cam 340 by ears 342 which fit in cam slots 344. Slide valve spring 346 is positioned between the cam 340 and the slide valve 338 and urges the valve flatly against the valve plate 348. The clutch control cam 340 has an enlarged section 350 supported by a smaller section 352 so that the clutch spring ends 354 and 356 are spread apart when they engage section 350, but move closer together when aligning with section 352. A small bar 358 is inserted through aligned openings in the spring sides 360 and 362 and is provided with enlarged or bent ends. The bar 358 tends to limit the amount of spread of the spring sides 360 and 362 and also keeps them in alignment. The transducer housing 296 is provided with inwardly extending spring centering lugs 364 and 366 which engage the spring sides 360 and 362 when the spring ends are spread apart, thereby establishing with the cam section 350 three position points on the spring 328 and locating the spring in a precise position when it is in a clutch released condition. The upper end of the clutch spring 328 is preferably formed into a reduced U-shape so that the valve pin 368 is received therein with just sufficient tolerance to permit slidable movement of the pin relative to the spring.

The pin 368 is secured to the slide valve 370 forming a part of the valve assembly 372. Valve 370 is formed as a cylinder which is slidable on a tube 374. One end of the tube is closed by a plug 376, and the other end is secured to and fluid connected with the fitting 378, which is connected in the system of FIGURE 2 to the conduit 280. The threaded portion of fitting 378 provides a firm mount in the transducer housing for the tube 374. Orifices 380 are formed in the side wall of the tube adjacent the plug 376 and are so positioned relative to the end 382 of the slide valve 370 that the valve end opens and closes the orifices in a modulating manner upon sliding movement. When the clutch spring 328 is in the released position and held in a center position by cam section 350 and lugs 364 and 366, the valve end 382 may be positioned approximately at the center of orifices 380 so that movement of the valve 370 in either direction will change the effective area of the orifices.

The clutch control cam 340 is secured to the solenoid armature 384 which is slidably mounted within the solenoid winding 386. The spring 388 engages the spring seat 390 mounted on the lower end of the armature 384 so that the armature and the cam 340, and therefore the slide valve 338, are urged downwardly into the position shown in the drawings. When the solenoid winding 386 is sufficiently energized, the armature 384 moves upwardly against the force of spring 388 so that the clutch spring ends 354 and 356 are aligned with the smaller cam section 352, and the spring sides 360 and 362 move inwardly to grip the clutch member 324, therefore establishing a certain angular relationship which is indicative of the actual vehicle speed occurring at the time. Since the clutch member 324 is preferably formed of a rubber-like material which will enhance the clutch-engaging force, the relationship so established will be carefully maintained.

The system operates as follows. The vehicle is considered to be running at a road speed of, for example, 20 m.p.h. Under such conditions the ignition switch 44 and the brake switch 46 are closed. The slide bar 56 engages contacts 52 and 58. The speed cup driven cam 326 has not advanced sufficiently to permit switch 392 to close. This switch is in series with the solenoid winding 386 and the contact 60 so that it must be closed before the winding 386 can be energized through electrical lead 66. While electrical lead 64 is directly connected from contact 58 to the winding 386 through resistor 70, this resistance is such that the power furnished the winding 386 through lead 64 is insufficient to move the armature 384 against the force of spring 388. Therefore the valve 338 is so positioned that passage 334 is connected with atmospheric pressure contained within the transducer housing chamber 298, being admitted through apertures 394 and filter 396. Passage 336 is connected only to the valve chamber 398 so that the end of conduit 76 connected to passage 332 is effectively closed. Since conduit 278 is connected to the servomotor and to the transducer assembly through passages 330 and 334, the servomotor chamber 240 is also at atmospheric pressure and is in a position equivalent to a zero throttle position, with the flexible link 230 being relexed. The clutch spring arms 360 and 362 are spread apart by cam section 350 so that the spring 328 does not grip the member 324. Instead, the spring is in a center position due to its engagement with the cam section 350 and the centering lugs 364 and 366. The valve 370 of the valve assembly 372 is also in the center position shown.

As the vehicle speed increases above that for which cam 326 is set, the cam allows switch 392 to close. The system may then be energized by the vehicle operator when desired. Assuming the vehicle operator to have accelerated the vehicle to a road speed of 50 m.p.h. by manual operation of the accelerator pedal 30, the system is in the position shown in FIGURE 2 of the drawings. Should the operator desire to energize the system at this speed, he moves the slide bar 56 of the manual switch 54 in the direction of arrow 62 until the bar also engages electrical contact 60. This energizes electrical lead 66, which bypasses the resistor 70 so that solenoid winding 386 is sufficiently energized to overcome the force of spring 388. Armature 384 therefore moves upwardly. The operator may then release the manual switch so that it returns to the position wherein the slide bar 56 only engages contacts 52 and 58. The portion of the electrical circuit including electrical lead 64 and resistor 70 will remain energized, being in parallel to electrical lead 66 and switch 392, and will act as a holding circuit for the solenoid winding since the resistor will permit sufficient current to be delivered to the winding 386 to hold armature 384 in the energized position.

Movement of armature 384 causes the valve 338 to move upwardly and fluid connect apertures 334 and 336 so that manifold vacuum is then connected to the servomotor through conduit 278. At the same time cam 340 has moved upwardly to release the spring ends 354 and 356 so that the spring sides or arms 360 and 362 grip the clutch member 324. Since the vehicle is traveling at 50 m.p.h. at the time of energization of the system, clutch member 324 is angularly positioned in a position reflecting that vehicle speed. Therefore, the actual vehicle speed at the time of system activation becomes the established desired vehicle speed.

The servomotor will then create a force which will tighten the flexible link 230 in tension, with the exact position at the time the link is tightened being determined by the position of the throttle valve 24. The valve assembly 372 will modulate atmospheric pressure into the servomotor in an amount sufficient to hold the throttle valve at the required position to maintain the desired vehicle speed established as above described.

Figure 10:
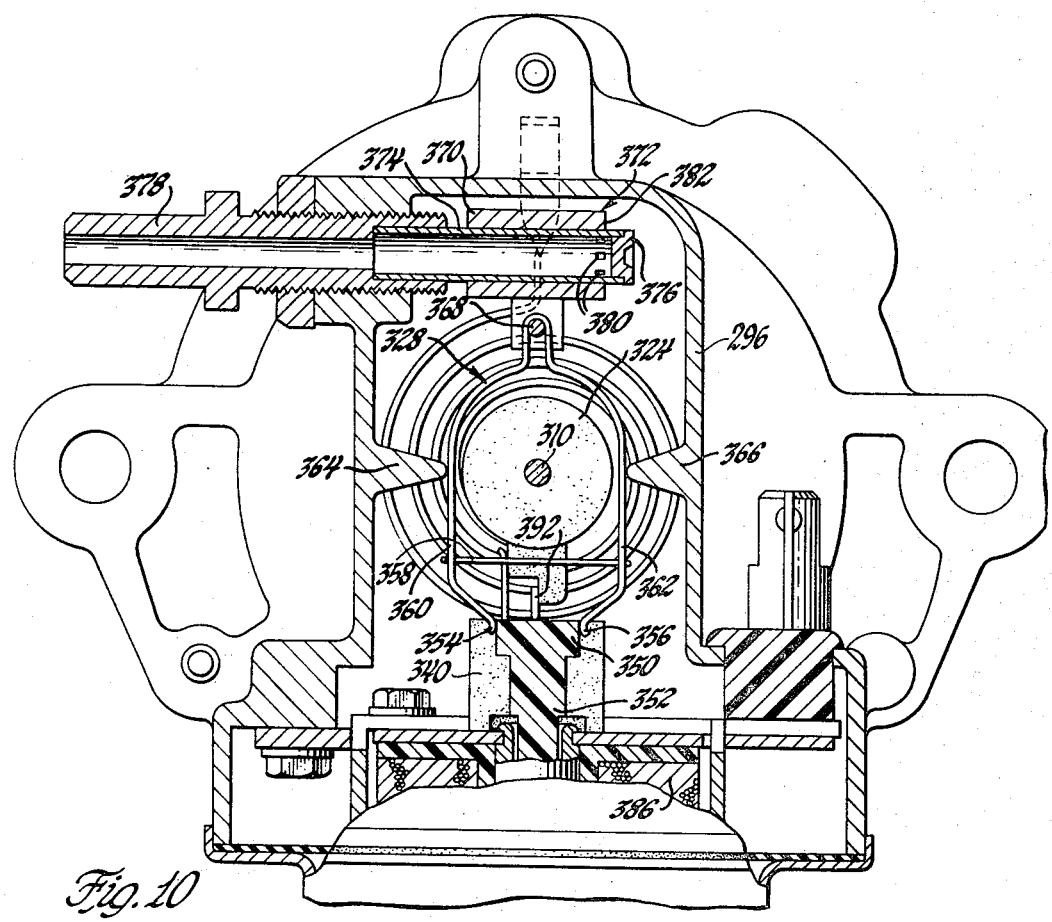
FIGURE 10 is a cross section view, with parts broken away, of the speed transducer of FIGURE 8, taken in the direction of arrows 10—10 of that figure.

When the vehicle speed changes due to changes in road load, the clutch spring 328 and clutch member 324 move angularly together. This in turn moves the valve member 370 to modulate the orifice means 380. If, for example, the vehicle tends to slow down due to an increase in road load, the clutching spring and the clutch member will move clockwise as seen in FIGURE 10, thereby moving the edge 382 of the valve member 370 to the right, as seen in that figure, decreasing the effective area of orifices 380. This decreases the amount of atmospheric pressure air bleeding into the servomotor chamber 240 through conduit 280, decreasing the absolute pressure therein and moving the throttle valve 24 to a slightly additional amount of opening position so that the vehicle engine delivers additional power and brings the vehicle back to the desired speed. On the other hand, if the vehicle tends to increase road speed due to a decrease in road load, the valve member 370 is moved slightly leftward to increase the effective area of orifices 380 and therefore increase the atmospheric pressure air bleed into the servomotor. This will slightly decrease the pressure differential acting on the servomotor power wall, allowing the throttle valve return spring to move the throttle valve 24 slightly closed since the throttle valve opening force exerted on the throttle linkage 228 through the flexible link 230 has been decreased. This will slightly decrease the power delivered by the engine and bring the vehicle back to the desired vehicle speed.

The vehicle operator may at any time accelerate the vehicle to a speed greater than the desired speed by manually depressing the accelerator pedal 30. This will merely result in slackening the flexible link 230. If the operator should accelerate the vehicle to a speed of 60 m.p.h., for example, and then desire to reset the system so that it will maintain this new speed, he merely presses the manual switch 54 inwardly until the slide bar 56 is connected with contacts 58 and 60 but disconnected from contact 52. This causes the solenoid 386 to be de-energized and the system is immediately returned to the condition shown in the drawings. The clutch member 324 is released by the clutch spring arms 360 and 362. The operator then releases the manual switch 54, while driving at the new desired vehicle speed. The slide bar 56 then returns to the position shown in solid lines in FIGURES 1 and 2, passing through a condition wherein all contacts 52, 58 and 60 engage the slide bar. While the slide bar passes through this position, the system is again energized, with the clutch spring 328 gripping the clutch member 324 at the new speed setting. The system then operates to control vehicle speed at the new speed.

The system is de-energized by opening brake switch 46 when the brakes are applied or by opening ignition switch 44. This results in immediate de-energization of solenoid 386 so that the system is returned to the inactive position. The vent valve 84 is also provided for actuation by the vehicle brake pedal 48 and will immediately vent the power servomotor chamber 240 to atmosphere, thereby serving as a mechanical system inactivation arrangement which does not depend upon movement of armature 384.

We claim:
1. A vehicle road speed control system comprising:
   a vehicle speed controller having;
       means manually operating the controller and a pressure powered servomotor selectively operating the controller;
   control mechanism for said servomotor including;
       a vehicle speed sensor,
       a servomotor pressure modifier having a center biased position from which it is movable to either side thereof,
       means selectively holding said modifier in said center biased position at all times during system inactivation
           and selectively establishing a vehicle speed correlation with said center biased position reflecting a desired attained vehicle speed while concurrently releasing said modifier,
       clutch means energized to be engaged upon release of said modifier and connecting said modifier to said vehicle speed sensor to move said modifier to change servomotor pressure in accordance with changes in magnitude and direction of vehicle speed from the desired vehicle speed to operate said vehicle speed controller to maintain actual vehicle speed substantially the same as the desired vehicle speed,
       and valve means intermediate a source of pressure and said servomotor and fluid pressure-connecting said servomotor to said source of pressure only when said clutch means is energized to be engaged.

2. The system of claim 1, further comprising: manually controlled power means connected to said selective means and said valve means to activate and inactivate said system by movement of said selective means and said valve means.

3. The system of claim 1, further comprising: a solenoid selectively energized to move said selective means from the modifier holding position to the vehicle speed correlation establishing position and connected with said valve means to concurrently connect said servomotor with said pressure source and thereby establish a pressure in said servomotor under control of said modifier.

4. The system of claim 3, further comprising: a control circuit for said solenoid having a first, normally closed, switch held open by said speed sensor until a predetermined vehicle speed is attained by manual operation of said vehicle speed controller; a second, normally open, manually closable, switch in series with said first switch; a third, normally closed, manually openable, switch in parallel with said first switch; a resistor between said third switch and said solenoid limiting energization of said solenoid around said second switch only to a holding current, said solenoid being initially energized by momentary manual closure of said second switch and being de-energized by manual opening of said third switch.

(References on following page)

References Cited

UNITED STATES PATENTS

| | | | |
|---|---|---|---|
| 2,990,825 | 7/1961 | Fuller et al. | 180—106 X |
| 3,092,090 | 6/1963 | Berninger | 180—108 X |
| 3,183,993 | 5/1965 | Parker et al. | 180—109 |
| 3,298,482 | 1/1967 | Mueller et al. | 180—106 X |
| 3,339,664 | 9/1967 | Beveridge et al. | 123—103 X |
| 3,340,952 | 9/1967 | Day | 180—108 |

KENNETH H. BETTS, *Primary Examiner.*

U.S. Cl. X.R.

73—519; 123—103